(12) United States Patent  (10) Patent No.: US 8,665,065 B2
Jenkins et al.  (45) Date of Patent: Mar. 4, 2014

(54) BARRIER OPERATOR WITH POWER MANAGEMENT FEATURES

(75) Inventors: Jeremy E. Jenkins, Bartlett, IL (US); Robert R. Keller, Jr., Park Ridge, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 217 days.

(21) Appl. No.: 13/081,252

(22) Filed: Apr. 6, 2011

(65) Prior Publication Data

US 2012/0255231 A1   Oct. 11, 2012

(51) Int. Cl.
*G08B 29/00* (2006.01)
*G08C 19/12* (2006.01)

(52) U.S. Cl.
USPC ................ 340/5.7; 340/13.33; 341/181

(58) Field of Classification Search
USPC ............. 49/25, 26, 28, 31; 340/932.2, 5.2, 340/5.21–5.28, 5.61–5.65, 5.7, 5.71, 340/13.24–13.25, 13.33–13.34; 341/176, 341/181; 375/130–149, E1.002, E1.033; 455/41.2, 151.2
See application file for complete search history.

(56) References Cited

U.S. PATENT DOCUMENTS

| | | | |
|---|---|---|---|
| 3,903,996 A | 9/1975 | Berkovitz et al. | |
| 4,263,536 A | 4/1981 | Lee et al. | |
| 4,621,452 A | 11/1986 | Deeg | |
| 4,733,158 A | 3/1988 | Marchione et al. | |
| 4,794,248 A | 12/1988 | Gray | |
| 4,914,859 A | 4/1990 | Gionet et al. | |
| 5,149,921 A | 9/1992 | Picado | |
| 5,233,185 A | 8/1993 | Whitaker | |
| 5,282,337 A | 2/1994 | Duhame et al. | |
| 5,285,136 A | 2/1994 | Duhame | |
| 5,353,341 A * | 10/1994 | Gillis et al. | 455/464 |
| 5,357,183 A | 10/1994 | Lin | |
| 5,428,923 A | 7/1995 | Waggamon | |
| 5,465,033 A | 11/1995 | Fassih-Nia | |
| 5,493,812 A | 2/1996 | Teich | |
| 5,584,145 A | 12/1996 | Teich | |
| 5,625,980 A | 5/1997 | Teich et al. | |
| 5,656,900 A | 8/1997 | Michel et al. | |
| 5,712,546 A | 1/1998 | Holthouse et al. | |
| 5,780,987 A | 7/1998 | Fitzgibbon | |
| 5,886,307 A | 3/1999 | Full et al. | |

(Continued)

FOREIGN PATENT DOCUMENTS

EP 0777029 6/1997
EP 1008233 6/2000

(Continued)

*Primary Examiner* — Benjamin C Lee
*Assistant Examiner* — Stephen Burgdorf
(74) *Attorney, Agent, or Firm* — Fitch Even Tabin & Flannery LLP

(57) ABSTRACT

A barrier operator system is provided including a controller, a motor, a barrier, a power source, and a remote transmitter. The controller scans for a reduced range of radio frequencies while operating in a standby mode to conserve energy. In response to receiving a signal from the remote transmitter, the barrier operator will exit the standby mode and scan for a broader range of frequencies. In response to receiving a command signal from the remote transmitter, the controller will operate the barrier. The controller also scans for signals from an accessory device after exiting the standby mode. The accessory device may also operate in multiple modes with respect to scanning for transmissions and sending signals to the controller.

20 Claims, 6 Drawing Sheets

(56) References Cited

U.S. PATENT DOCUMENTS

| | | |
|---|---|---|
| 5,969,637 A | 10/1999 | Doppelt et al. |
| 6,005,780 A | 12/1999 | Hua |
| 6,181,095 B1 | 1/2001 | Telmet |
| 6,184,641 B1 | 2/2001 | Crimmins et al. |
| 6,194,851 B1 | 2/2001 | Denault et al. |
| 6,225,768 B1 | 5/2001 | Cookson et al. |
| 6,243,006 B1 | 6/2001 | Rejc et al. |
| 6,247,558 B1 | 6/2001 | Bailey et al. |
| 6,329,779 B1 | 12/2001 | Pimley et al. |
| 6,346,889 B1 | 2/2002 | Moss |
| 6,388,412 B1 | 5/2002 | Reed et al. |
| 6,563,278 B2 | 5/2003 | Roman |
| 6,590,872 B1 * | 7/2003 | Shiue et al. ............ 370/314 |
| 6,597,138 B2 | 7/2003 | Fitzgibbon |
| 6,597,589 B2 | 7/2003 | Wang |
| 6,621,256 B2 | 9/2003 | Muratov et al. |
| 6,622,925 B2 | 9/2003 | Carner et al. |
| 6,633,823 B2 | 10/2003 | Bartone et al. |
| 6,696,806 B2 | 2/2004 | Study et al. |
| 6,720,747 B1 | 4/2004 | Fitzgibbon et al. |
| 6,732,476 B2 | 5/2004 | Mehalshick et al. |
| 6,737,968 B1 | 5/2004 | Ergun et al. |
| 6,744,231 B2 | 6/2004 | Fitzgibbon et al. |
| 6,904,717 B2 | 6/2005 | Clark et al. |
| 6,996,154 B2 * | 2/2006 | Haas ..................... 375/132 |
| 7,045,764 B2 | 5/2006 | Beggs et al. |
| 7,081,713 B2 | 7/2006 | Jurs et al. |
| 7,221,288 B2 | 5/2007 | Fitzgibbon et al. |
| 7,327,249 B1 | 2/2008 | Murray |
| 7,375,612 B2 * | 5/2008 | Murray et al. ............ 340/5.71 |
| 7,518,326 B2 | 4/2009 | Shier |
| 7,590,432 B2 * | 9/2009 | Behzad et al. ............ 455/574 |
| 7,755,223 B2 | 7/2010 | Fitzgibbon |
| 7,855,475 B2 | 12/2010 | Fitzgibbon |
| 7,956,718 B2 | 6/2011 | Murphy et al. |
| 8,102,897 B1 * | 1/2012 | Mower et al. ............ 375/146 |
| 8,314,509 B2 | 11/2012 | Fitzgibbon |
| 8,542,093 B2 | 9/2013 | Rodriguez |
| 2003/0107475 A1 * | 6/2003 | Bautista et al. ............ 340/7.35 |
| 2004/0164693 A1 * | 8/2004 | Murray et al. ............ 318/286 |
| 2007/0126552 A1 * | 6/2007 | Fitzgibbon ............ 340/5.71 |
| 2007/0285276 A1 * | 12/2007 | Lazar ............ 340/870.02 |
| 2009/0116431 A1 * | 5/2009 | Cadieux ............ 370/329 |
| 2013/0027180 A1 * | 1/2013 | Lakamraju et al. ............ 340/5.53 |

FOREIGN PATENT DOCUMENTS

| | | |
|---|---|---|
| GB | 2282639 | 4/1995 |
| GB | 2361310 | 10/2001 |
| GB | 2406880 | 4/2005 |
| WO | WO9723946 | 7/1997 |

* cited by examiner

BARRIER OPERATOR WITH POWER MANAGEMENT FEATURES

TECHNICAL FIELD

This invention relates generally to movable barrier operators. More particularly, it relates to barrier operators having improved energy efficient features.

BACKGROUND

Typical garage door openers are known in the art and have become more sophisticated over time to provide increased security and functionality. However, the various technological improvements and features of barrier operators result in higher energy consumption.

Barrier operators, such as garage door openers or automated gate openers, are capable of using various power sources. One such power source can be an AC power connection. Another power source can be a battery. Solar power may also be used as a power source, either by connecting to a home's power grid or by charging a battery. A solar power charged battery is a beneficial option in many situations, including a detached garage located away from the home or other structure, a stand-alone barrier without access to a power grid, or as an alternative to using an available power grid to improve overall energy efficiency.

Barrier operators typically include a controller that sends control signals to an operator motor to open or close the barrier as needed. The controller typically includes a radio receiver that receives a signal that instructs the controller to open or close the barrier. The signal is typically a radio frequency ("RF") signal sent from a remote transmitter to the controller. A single frequency RF signal can be used, but this solution is generally not secure in that it can be more easily captured and duplicated.

Another type of signal transmission is a spread spectrum signal. The spread spectrum signal includes multiple frequencies making the signal more secure and more difficult to duplicate. However, a transmitter/receiver using a spread spectrum signal typically uses a radio receiver that scans these multiple frequencies to receive the signal. Scanning a wide range of spread spectrum frequencies uses a higher amount of power from the power source. Thus, to utilize the broad range spread spectrum signal/receiver combination for the increased security, the garage door opener typically draws more power, becoming more expensive and/or draining the attached battery.

In addition to the barrier operator that opens and closes the barrier, barrier operator systems typically include additional components that communicate with the operator. For example, garage door opener systems generally include a safety system that can detect if a person or object is in the path of the door. If an object is in the path of the door, the safety system transmits a signal to the garage door operator, and the garage door ceases closing or reverses direction to prevent closing on the object or person. The safety system may communicate wirelessly with the garage door operator using a spread spectrum RF signal, as well, in order to improve security and reliability. Similarly, this results in higher energy consumption.

Other components of the garage door system may also utilize a spread spectrum communication with the garage door operator, potentially requiring a relatively higher amount of energy consumption.

SUMMARY

A barrier operator system is provided including a controller and a motor for opening and closing a barrier, for example, a gate or garage door. The controller includes a radio receiver capable of scanning and receiving a spread spectrum radio transmission to command a barrier operator to perform an action such as opening or closing. A remote transmitter transmits a signal that is received by the radio receiver, which in turn causes the controller to operate the barrier. The transmitter in one approach transmits a spread spectrum RF signal over a reduced frequency range. Additionally, the radio receiver scans a reduced frequency range to conserve energy. By one approach, the controller is powered by a battery that is periodically charged by solar power.

The system is capable of operating in both an active state and a sleep state. In the active state, the system scans the limited range of spread spectrum frequencies for RF signals from the transmitter. In the sleep state, the system does not scan any frequencies to further conserve energy. By one approach, the system periodically alternates between the active state and the sleep state to conserve energy relative to a single active state of continuously scanning for signals over one range of spread spectrum frequencies. The alternating between the active state and the sleep state combined with the reduced range of spread spectrum frequencies to scan conserves overall energy use of the system.

By another approach, the range of frequencies can be adjusted depending on the particular installation requirements of the system. The amount of power consumption depends in part on the range of frequencies scanned, as well as the time spent in the active state relative to the time spent in the sleep state. Thus, various profiles are possible depending on an amount of power available or the particular needs of the user. For example, if a battery is capable of holding a larger charge, the range of frequencies scanned can be increased to provide higher levels of security or reliability without using all of the battery's available power. If the available power is limited in the case of, for example, a battery holding a lower charge, the higher level of security and reliability afforded by the use of spread spectrum frequencies can be maintained by limiting the amount of time spent in the active state. If a lower level of security is acceptable to the user, the range of frequencies to be scanned can be reduced to prolong life of the available power source. Thus, these variables can be adjusted to optimize the use of the system depending on the needs of the user. The system could also automatically adjust these settings depending on the amount of power available at a given time. The ability to adjust these various settings provides a robust solution capable of accommodating a wide range of requirements.

The barrier operator system may also include accessory devices that are also capable of operating with spread spectrum transmitters and receivers. These accessory devices are capable of communicating with the controller using spread spectrum RF signals. The accessory device in one example includes a transceiver that can both receive RF signals and transmit RF signals to other devices, such as the controller. The accessory device may have multiple operating states. In one operating state, the accessory will scan a single frequency RF signal or a reduced number of spread spectrum frequencies to conserve power. In another operating state, the accessory will communicate with the controller of the barrier operator by way of the full spread spectrum communication approach. The accessory can also enter a sleep state, where it does not scan for or broadcast any RF signals.

By one approach, the accessory device scans the single frequency RF signal, thus conserving power. The remote transmitter transmits the corresponding single frequency RF signal along with the reduced range spread spectrum signal. The accessory receives the single frequency signal, which causes the accessory to begin communicating with the controller using reduced spread spectrum frequencies. The accessory can then communicate with the controller as needed, and can subsequently return to scanning the single RF frequency when communication with the controller is complete.

In one example, the accessory could be a safety device that signals to a garage door controller in response to detecting an object or person in the path of a garage door. When the garage door is closed or otherwise not moving, the accessory does not need to communicate with the controller. At this time, the accessory can merely scan for the single RF frequency. When the garage door operator is activated by the remote transmitter, the safety device also receives the single RF frequency at approximately the same time such that the safety device is activated as the garage door begins to move. The safety device then begins communicating with the controller using the reduced spread spectrum signal or a broadband signal. If the safety device detects an object, it can signal the controller to stop. Once the door is closed, the controller can communicate a signal to the safety device that returns it to the single frequency scan state. By one approach, while not in the spread spectrum communication state, the accessory can periodically alternate between the single frequency scan state and the sleep state to further conserve power.

BRIEF DESCRIPTION OF THE DRAWINGS

The above needs are at least partially met through provision of the barrier operator with power management features described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
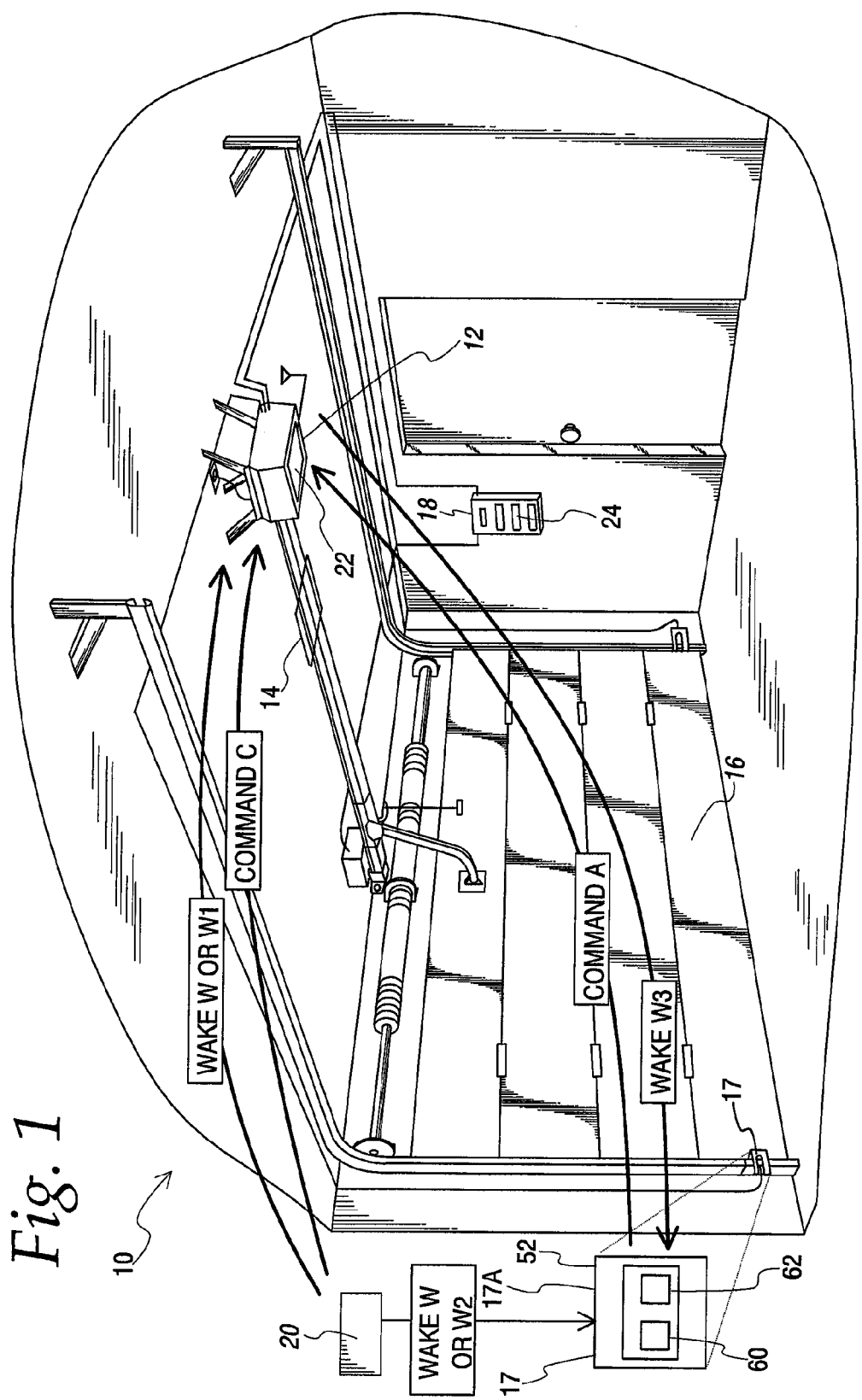
FIG. 1 comprises a barrier operator system as configured in accordance with various embodiments of the invention.

As shown in FIG. 1, an example barrier operator system 10 includes a controller 12, a motor 14, a barrier 16, a power source 18, and a remote transmitter 20. The system 10 may also include an accessory device 17 configured to communicate with the controller 12. By one approach, the controller 12 is operably connected to the motor 14 which in turn is operably connected to the barrier 16 to move the barrier 16 between various positions, such as from a closed position to an open position. The general configuration and operation of a typical barrier operator system is well known in the art.

The barrier 16 may be in the form of a garage door or gate. However, other barriers may also be used. For purposes of discussion, the operation of the barrier 16 will include the description of a garage door, but the described operation of the system 10 applies to barriers in general.

The controller 12 includes a radio receiver 22. The radio receiver 22 is capable of scanning various ranges and types of radio frequencies ("RF") and signals including a broad range of spread spectrum frequencies and signals. Spread spectrum signals include broadband signals having a plurality of frequencies and reduced band signals having a plurality of frequencies but fewer than the number of frequencies used in a typical spread spectrum broadband signal. In but one example, a full range of frequencies includes three frequencies in the 300 MHz range (for instance 315 MHz, 345 MHz, and 390 MHz) and three frequencies in the 400 MHz range (433 MHz, 466 MHz, and 499 MHz), and a fewer number of frequencies for this example includes 315 MHz and 433 MHz. In addition to the spread spectrum signals, in one approach, the radio receiver 22 is capable of scanning single frequency signals as well as other frequency forms known in the art. Generally, spread spectrum signals provide a more reliable and secure signal than a single frequency RF signal because they are more difficult to duplicate and are less susceptible to interference from other frequency sources. The radio receiver 22 is responsive to signals sent from the remote transmitter 20. In response to receiving these signals, the controller 12 generates control signals for controlling barrier movement depending on the signals received at the controller 12.

The controller 12 and the accessory device 17 are generally capable of operating in two general modes: an operation mode and a standby mode. In the operation mode, the component (either the controller 12 or the accessory device 17) will operate in an active state and generally continuously scan for command signals from components associated with the system. For example, the controller 12 may scan for command signals from the remote transmitter 20 or the accessory device 17. Similarly, the accessory device 17 may scan for command signals from the remote transmitter 20. These components may also be capable of scanning for signals from a variety of other sources known in the art.

In the standby mode, the component will generally alternate between a sleep state, where the component does not scan for command signals, and an active state, where the component scans for command signals.

Thus, in both the operation mode and the standby mode, the components are configured to receive command signals. Indeed, both the operation mode and the standby mode include an active state for at least some period of time. For purposes of discussion, the generally continuous signal scanning during the operation mode will be referred to as the "operation active state"; the signal scanning during the standby mode will be referred to as the "standby active state." The general operation of the modes and states are described in further detail herein.

The controller 12 includes a processor device configured to perform the various operations described herein. Those skilled in the art will recognize and appreciate that such a processor device can comprise a fixed-purpose hard-wired platform or can comprise a partially or wholly programmable platform. All of these architectural options are well known and understood in the art and require no further description here.

In different approaches, the controller 12 is capable of one or both of manual or automatic adjustment from one operating state to another. For example, the controller 12 can change from scanning for and receiving one type of RF signal to scanning for and receiving another type of RF signal depending on the particular requirements and settings of the system 10.

As described above, the controller 12 is also configured to operate in multiple modes. For example, the controller 12 can operate in either the operation mode or the standby mode. The operation mode is generally used while the barrier 16 is in use. The standby mode is generally used when the barrier 16 is not in use. As a function of operating in one of the modes, the controller 12 can operate in one of the various states as generally described above: the operation active state, the sleep state, or the standby active state. While operating in the sleep state, the controller 12 refrains from scanning or receiving RF signals for a period of time. This period of time can be adjusted manually or automatically based on the needs of the system. While operating in one of the operation active state or the standby active state, the controller 12 scans for various types of RF signals that can command the system 10. More specifically, the controller 12 causes the receiver 22 to scan for command signals.

While operating in the operation mode, the controller 12 will cause the receiver 22 to be in the operation active state such that the receiver 22 generally continuously scans for signals for an extended period of time. Generally, the receiver 22 scans for a broader range of frequencies during the operation active state than it does during the standby active state.

While in the standby mode, the controller 12 will cause the receiver 22 to periodically alternate between the sleep state and the standby active state. The amount of time spent in either state can be manually or automatically adjusted to suit the requirements of the system 10. For example, while in the standby mode, the receiver 22 may operate in the sleep state for a time in a range of about 200 to 600 milliseconds such as 250 or 500 milliseconds, and then operate in the standby active state for a time in a range of about 25 to 75 milliseconds such as 50 milliseconds. Other times could be used that allow the receiver 22 to not be powered on to conserve energy but still wake often and long enough to receive signals as may be useful in a given situation. For instance, longer sleep states can be used where a missed signal causing a resending of the signal is not critical or overly disadvantageous for a user. The less time spent scanning for command signals in the standby active state, the more power is conserved.

By one approach, the receiver 22 could be set to sleep for an extended period of time such as during periods where use is unnecessary. The ability to alter the configuration of the sleep state depending on the requirements of the system 10 provides for a robust solution for conserving energy while also providing for reliable operation.

When operating in the standby mode, the controller 12 may be configured to exit the standby mode upon receiving, at the receiver 22 operating in the standby active state, a signal or command to do so such as a wake signal. The signal can come from a variety of sources. By one approach, the wake signal may be a RF signal sent from the remote transmitter 20. By another approach, the wake signal could be accomplished manually at the controller 12 or from a remote device, such as a wall control, connected to the controller 12.

Once the controller 12 has exited the standby mode, it operates in the operation mode and commands the receiver 22 to be in the operation active state. While operating in the operation active state, the controller 12 uses the receiver 22 to generally continuously scan for the selected RF type. Generally, the receiver 22 scans for a broader range of RF signals in the operation active state than during the standby active state.

The controller 12 and the motor 14 are connected to the power source 18. By one approach, the power source 18 is a battery 24 that is capable of recharging through a mains power or through solar charging. The configuration and operation of solar charging batteries and associated components are well known in the art. Generally, the battery 24 is charged using solar power and discharged as power is required by the controller 12 and motor 14, or any other device that is connected to the battery 24 for power. After or during the discharge of the battery 24, the battery 24 is recharged using solar energy. Additionally, alternative types of power sources 18 known in the art may be used, such as a typical home or commercial building power source connected to a power grid. The solar charging battery 24 may integrate with the home or commercial power source as well, such that when the battery is fully charged, the solar power can be used to supply power to other electrical components connected to the power grid that may or may not be part of the barrier operator system 10.

The transmitter 20 is, by one approach, portable for remote use such as in a vehicle. The transmitter 20 is capable of transmitting command outputs configured for reception at the controller 12 through the receiver 22. For example, the transmitter 20 can send a command signal for opening or closing the barrier 16. The transmitter 20 may be capable of sending one or more of a variety of signal types, such as single frequency RF, broadband spread spectrum, reduced band spread spectrum, and other types of RF signals known in the art.

By one approach, the transmitter 20 is configured to send one transmission when the transmitter 20 is activated. The transmission may include multiple RF signal types, such that the single transmission is capable of controlling multiple components. For example, the transmission from the remote transmitter 20 is capable of waking a component that is operating in the standby mode and also commanding the component after it has exited the standby mode and begins operating in the operation mode. More specifically, in one approach, the transmission includes a single frequency RF signal, a reduced band spread spectrum signal, and a broadband spread spectrum signal. Thus, regardless of the mode in which the component is operating, the transmission will include the necessary signal to effect operation of the component. In some cases, the various signal types can be embedded, such that the single frequency signal is contained within the reduced band signal, and the reduced band signal is contained within the broadband signal. Thus, one signal including a broad range of spread spectrum signals includes each of the various frequencies for which the components are scanning or will at one point scan. Thus, as long as the components are scanning for the particular frequencies included in the one signal, the components will receive the corresponding signal. In one example, the single frequency RF signal is one of the frequencies contained in the reduced band spread spectrum signal, and the frequencies of the reduced band spread spectrum signal are also frequencies used in the broadband spread spectrum signal.

As previously mentioned, the system 10 may further include the accessory device 17 configured for communication with the controller 12. By one approach, the accessory device 17 includes an accessory transceiver 52 capable of both transmitting one or more various RF signals and receiving one or more various RF signals. For example, the accessory transceiver 52 may scan for and receive a single frequency signal, a broadband spread spectrum signal, and/or a reduced band spread spectrum signal. In addition, the accessory transceiver 52 may transmit a single frequency signal, a broadband spread spectrum signal, and/or a reduced band spread spectrum signal. The general configuration and operation of a typical transceiver is well known in the art. In addition to the above mentioned types of signals that the accessory transceiver 52 can transmit and receive, the accessory transceiver 52 may also be capable of transmitting and receiving other types of signals and frequencies known in the art. Depending on the type of accessory device 17 or the needs of the user, various transmit and receive combinations are possible. For example, the accessory device 17 could be configured to transmit through the accessory transceiver 52 a broadband spread spectrum signal while being configured to receive a single frequency signal, or other combinations.

The accessory device 17 can be one of many various types of accessory devices known in the art for use in combination with typical barrier operators. For example, the accessory device 17 could be a photo-eye 17a. The photo-eye 17a can detect whether an object is located in a particular position and communicate with the controller 12 to stop the barrier 16 from moving.

The accessory device 17 could be a remote light control. Remote light controls allow for the control of particular lights by the remote transmitter 20.

The accessory device 17 could be a garage door monitor. Garage door monitors allow for communicating or signaling whether or not the garage door or barrier 16 is in the open or closed position from a remote location where visual monitoring is not possible or inconvenient.

The accessory device 17 could be a parking accessory. Parking accessories assist a vehicle operator with positioning the vehicle in a predetermined location.

There are various other accessory devices 17 known in the art that are also capable of use with the barrier operator system 10. For the purposes of discussion, these various known devices will be referred to generally as the accessory device 17.

By one approach, the accessory device 17 is connected to the power source 18. Alternatively, the accessory device 17 may be powered separately from the controller 12 and other components of the system 10. For example, the accessory device 17 could be powered by a separate battery or connected to a power grid. Other general sources of power known in the art would also suffice for supplying power to the accessory device 17.

As stated above, the accessory device 17 includes an accessory transceiver 52 capable of transmitting and receiving one or more various RF signal types. By one approach, the accessory device 17 includes an accessory transmitter 60 and an accessory receiver 62 to transmit and receive RF signals, respectively. The accessory transmitter 60 is capable of transmitting one or more various RF signals such as single frequency signals, broadband spread spectrum signals, and/or reduced band spread spectrum signals. Similarly, the accessory receiver 62 is capable of scanning and receiving one or more various RF signals such as single frequency signals, broadband spread spectrum signals, and/or reduced band spread spectrum signals.

By one approach, the accessory device 17 is configured to communicate with both the remote transmitter 20 and the controller 12. For example, the accessory device 17 can receive signals sent from the remote transmitter 20 and also transmit signals to the controller 12. By another approach, the accessory device 17 may also receive signals from the controller 12 where the controller 12 includes transmission capability.

The accessory device 17 can be configured, manually or automatically, to operate in the various modes and states, similar to the controller 12 and receiver 22, as described above. For example, the accessory device 17 can change from one type of RF signal transmission to another depending on the mode in which it is operating. The accessory device 17 can also change the type of RF signal to scan for and receive depending on the mode in which it is operating.

The accessory device 17 is capable of operating in both the operation mode and the standby mode in a manner similar to the controller 12 and receiver 22. Accordingly, the accessory device 17 can operate in one of the sleep state, the standby active state, and the operation active state depending on the mode. Thus, the accessory device 17 can operate in the standby mode where it alternates between the sleep state and the standby active state until receiving a wake signal. Once the accessory device 17 has exited the standby mode, it will operate in the operation mode, during which mode the accessory device 17 operates in the operation active state and scans for signals generally continuously. Similar to the controller 12 and the receiver 22, the accessory device 17 generally scans for a broader range of RF signals in the operation active state of the operation mode than in the standby active state of the standby mode. For example, if the accessory device 17 scans for a single frequency signal while operating in the standby active state of the standby mode, the accessory device will scan for either a reduced band spread spectrum signal or a broadband spread spectrum signal while operating in the operation active state of the operation mode. If the accessory device scans for a reduced band spread spectrum signal in the standby active state of the standby mode, it will scan for a broadband spread spectrum signal in the operation active state of the operation mode.

While the various components of the barrier operator system 10 have been generally described above, other variations of the components and alternatives known in the art will also suffice to accomplish the operations described herein.

As described above, the barrier operator system 10 and accessory devices 17 are capable of operating in a variety of modes depending on the needs of the user or the needs of the system. The user can tailor the configuration of the system 10 to accommodate the desired security and power consumption needs. For example, scanning for a single RF frequency consumes less power than scanning a reduced band spread spectrum frequency, which in turn consumes less power than scanning a broadband spread spectrum frequency. However, a single RF frequency provides less security than a reduced band spread spectrum frequency, which provides less security than a broadband spread spectrum frequency. Narrower frequency bands are generally easier to duplicate than broader frequency bands. Additionally, more time spent in the sleep state conserves power, but spending more time in the sleep state may result in less reliable signal reception. With these concepts in mind, there are a variety of configurations that provide various levels of energy conservation, security, and reliability to suit the needs of the user.

Figure 2:
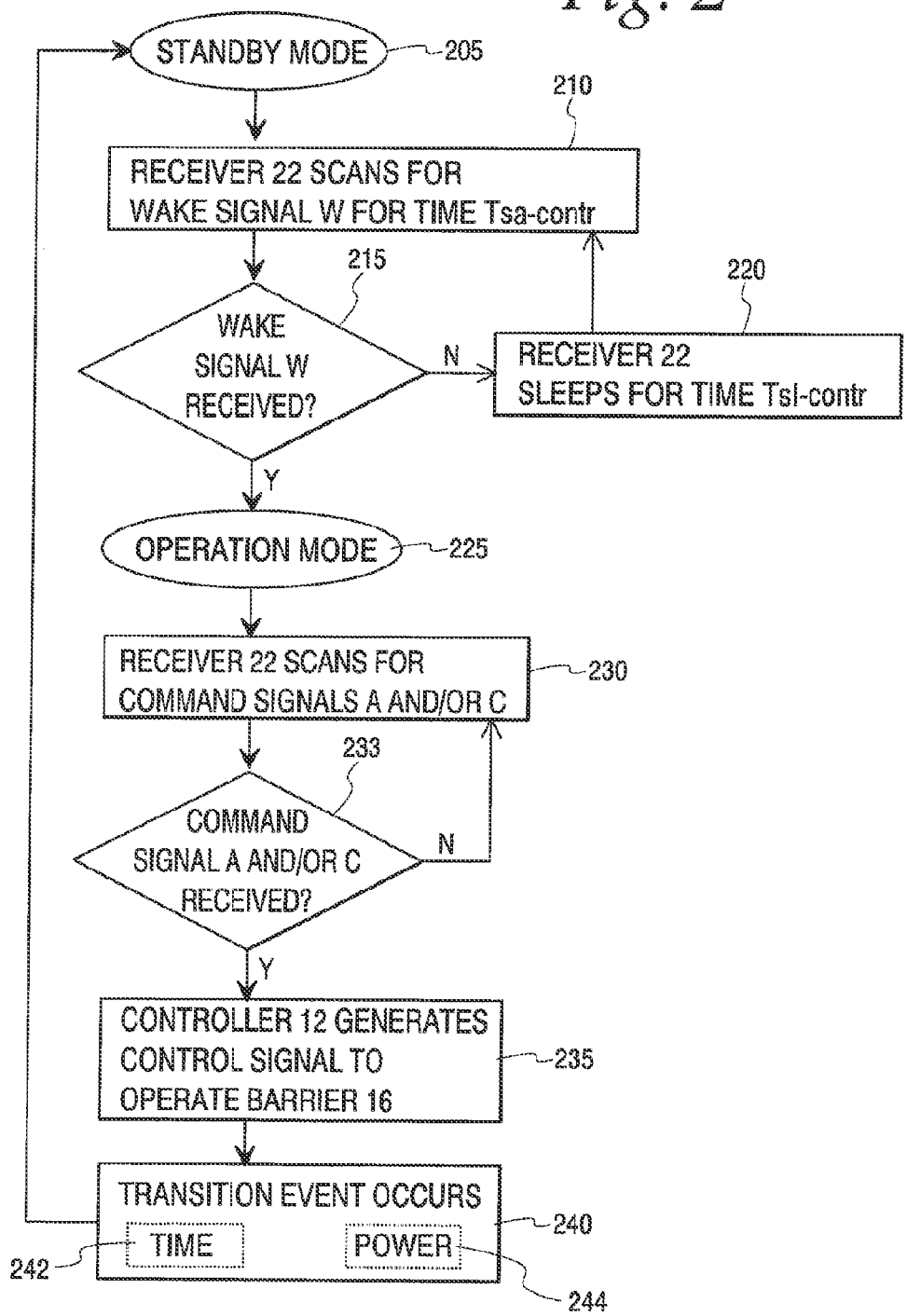
FIG. 2 comprises a first flow chart of a controller as configured in accordance with various embodiments of the invention.

As shown in FIG. 2, by one approach (embodiment 1), the controller 12 operates in the standby mode 205 to conserve energy. In this particular configuration, because the controller 12 is operating in the standby mode 205, the receiver 22 alternates between scanning 210 for a wake signal W for a specified period of time Tsa-contr (the Time for the standby active state for the controller) and refraining 220 from scanning for a period of time Tsl-contr (the Time for the sleep state for the controller). For example, in one approach, during the standby active state of the standby mode 205, the receiver 22 scans 210 for 50 milliseconds, and if it does not receive a signal at step 215, the receiver 22 refrains 220 from scanning for 500 milliseconds in the sleep state before returning to scan 210 for 50 milliseconds in the standby active state of the standby mode. In other approaches, other time periods may be used in both the sleep state and the standby active state of the standby mode.

In one approach, the wake signal W, which is transmitted from the transmitter 20 for reception at the receiver 22, is a reduced band spread spectrum signal. In other approaches, other frequency types or ranges can alternatively be used for the wake signal W.

The remote transmitter 20 generally transmits its signal, including the wake signal W, for a period of time at least as long as the amount of time the receiver 22 refrains 220 from scanning while in the sleep state. This allows the receiver 22 to detect the wake signal W from the remote transmitter 20 if the transmission is initiated during the time when the receiver 22 refrains 220 from scanning If the receiver 22 receives the correct wake signal W from the remote transmitter 20 at step 215, the controller 12 exits the standby mode 205 and enters the operation mode 225. However, in some approaches, sleep states longer than the period of time of the transmission can be used where a missed signal causing a resending of the signal is not critical or overly disadvantageous for a user.

In the operation mode 225, the receiver 22 generally continuously scans 230 for command signals C from the transmitter 20 while operating in the operation active state. The controller 12 also scans 230 for command signals A from the accessory device 17. The command signal C in this approach is a broader spectrum signal than the wake signal W. Scanning 230 for the broader command signal C allows for the receiver 22 and the controller 12 to maintain a higher level of security than it does when scanning 210 for the narrower wake signal W. The differentiation between scanned frequency types during the standby active state 210 and operation active states 230 allows for an extra level of security if the narrower frequency signal is reproduced by an unauthorized transmitter.

Several combinations of the wake signal W, command signal C, and command signal A are possible with examples set out in Table 1 below. In combination 1, with the wake signal W being a reduced band spread spectrum signal, the command signal C is a broadband spread spectrum signal. Alternatively, the command signal C can be broader or narrower. Generally, the command signal C has a broader frequency range than the wake signal W to add the extra level of security. However, in some other approaches, the command signal C range of frequencies could be narrower than or the same as the wake signal W.

In combination 1, the remote transmitter 20 transmits a signal that includes at least the reduced band spread spectrum frequency (wake signal W) corresponding to the scanned frequency at step 210. The transmitter 20 also transmits a broadband spread spectrum frequency (command signal C) either in addition to the reduced band frequency or by encompassing the reduced band frequency. For example, the command signal C frequency range could include the wake signal W frequency range, such that one signal could be transmitted that is configured to be received at both step 215 and step 233. Thus, generally, the transmission signal from the transmitter 20 includes both the wake command W and the command signal C in some form. Therefore, once the controller 12 has transitioned from the standby mode 205 to the operation mode 225, the receiver 22 will receive 233 the command signal C (broadband spread spectrum signal in this embodiment) preferably without requiring additional action at the remote transmitter 20. The single activation at the transmitter 20 is generally sufficient to both wake the receiver 22 and command the barrier 16. In the event that the command signal C is not received 233 at after the single activation at the transmitter 20, subsequent activation of the transmitter 20 will re-send the transmission including the command signal C, which in turn will operate the barrier 16.

In response to receiving 233 the command signal C at the receiver 22, the controller 12 generates 235 control signals for controlling the motor 14, thereby controlling movement of the barrier 16. The controller 12 and receiver 22 will continue to operate in the operation mode 225, wherein the receiver 22 is capable of receiving additional signals and commands from the remote transmitter 20, until occurrence of a transition event 240 such as passage of a period of time 242 or receipt of an indication of a reduced power capacity 244 for the system 10. For example, after a predetermined period of time where the controller 12 and receiver 22 do not receive any transmissions, the controller 12 and the receiver 22 will return to the standby mode 205 operation described above. In another example, the controller 12 determines that the power available to the system 10 is below a threshold, in response to which the controller 12 will transition to operating in the standby mode 205. In another example, the controller 12 transitions to operating in the standby mode 205 in response to the first of either the passage of a period of time 242 or receiving a signal regarding the power available 244 to the system. In another approach, the transition 240 occurs in response to the occurrence of both transition events 242 and 244. Other transition events and combinations are possible wherein the controller 12 receives a signal or determines that a transition event has occurred such that the controller transitions 240 back to the standby mode 205 from the operation mode 225.

The approach of FIG. 2 allows for both energy conservation and a high level of security. By operating in the standby mode 205, the system 10 requires less power than if it was operating exclusively in the operation mode 225 because of the time spent in the sleep state. By using the standby mode 205 that monitors for the wake command W (reduced band spread spectrum signal), the system 10 maintains a high level of security because the spread spectrum signal is more difficult to duplicate than a single frequency. Once operating in the operation mode 225, the broadband spread spectrum scanning further increases the level of security because it is more difficult to duplicate a broadband spread spectrum frequency than a reduced band signal. This energy saving approach, for example, can be applied to a configuration where the power source 16 is in the form of a solar charged battery.

Figure 3:
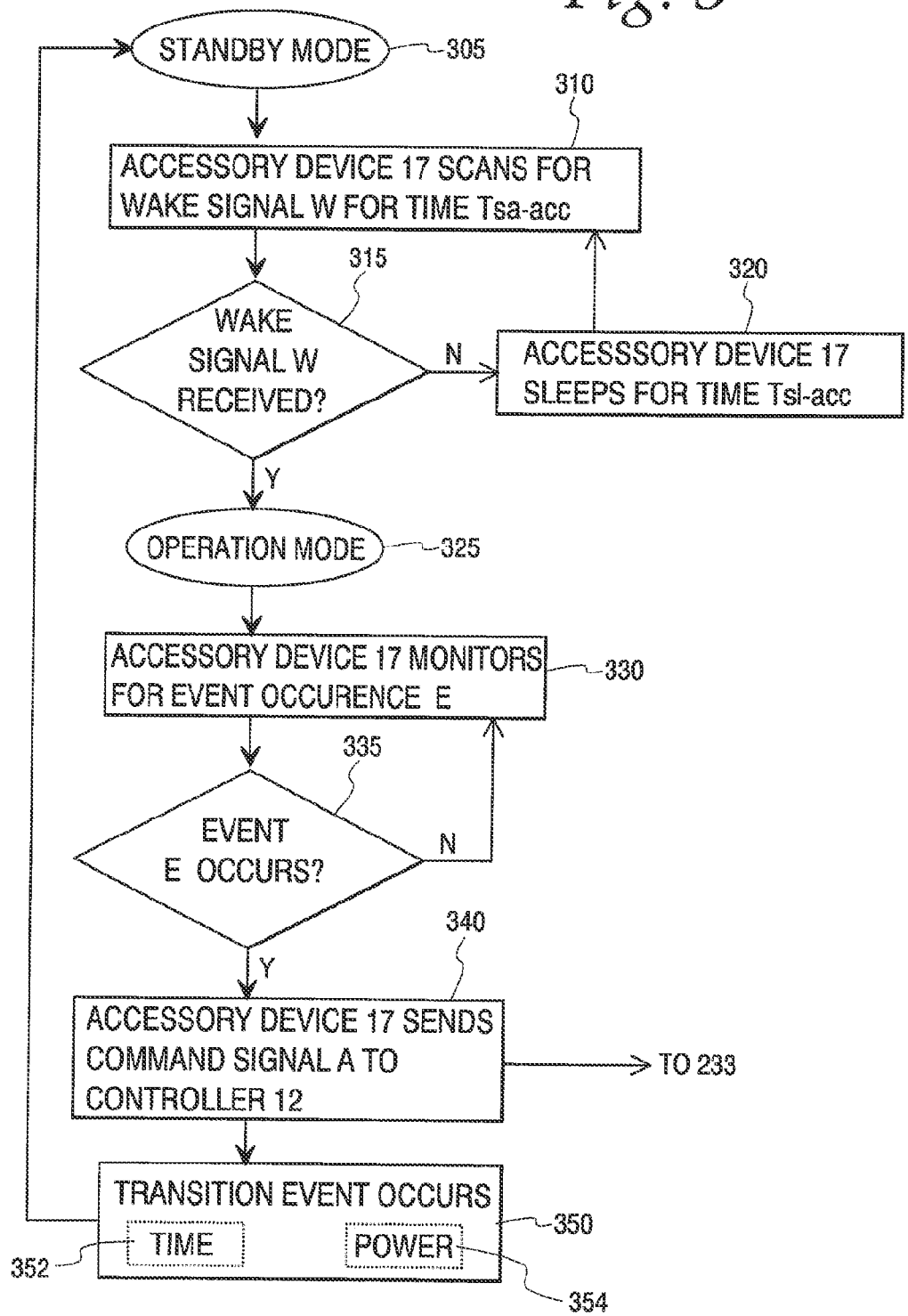
FIG. 3 comprises a flow chart of an accessory device as configured in accordance with various embodiments of the invention.

As shown in FIG. 3, the accessory device 17 operates in a manner similar to the controller 12. The accessory device 17 is configured to both transmit command signals A to the controller 12 and to scan for and receive wake signals W from the remote transmitter 20. Similar to the controller 12, the accessory device 17 will operate in the standby mode 305 when the accessory device 17 is generally not in use. While operating in the standby mode 305, the accessory device 17 will alternate between scanning 310 for a wake signal W from the remote transmitter 20 (reduced spread spectrum signal in this instance) for a specified period of time Tsa-acc (the Time for the standby active state for the accessory device) while operating in the standby active state of the standby mode 205. The accessory device 17 will determine 315 if the wake signal W is received. If the wake signal W is not received, the accessory device will sleep 320 (refraining from scanning) for a specified period of time Tsl-acc (the Time for the sleep state for the controller). The accessory device 17 will then return to the standby active state and scan 310 once again for the wake signal W. If the accessory device 17 determines 315 that the wake signal W was received, the accessory device 17 enters the operation mode 325.

While in the operation mode 325, the accessory device 17 sends command signals A, as necessary, to the controller 12 using, in this approach, a broadband spread spectrum frequency for a high level of security and reliability. More specifically, the accessory device 17 will monitor 330 for the occurrence of an event E. The accessory device 17 determines 335 whether the event E occurs. If so, the accessory device 17 sends 340 command signal A to the controller 12. As previously described in FIG. 2 at step 230, the receiver 22 is scanning for both command signals A and C. Thus, upon receiving 233 command signal A from the accessory device 17, the controller 12 will generate 235 a control signal for operating the barrier 16 as previously described. The accessory device 17 will return to the standby mode 305 in a manner similar to that of the controller 12, wherein the accessory device 17 will revert to the standby mode 305 after occurrence of a transition event 350. The transition event 350 can be either based on an elapsed time 352 or based on a power level 354 of the system 10. Once back in the standby mode 305, the accessory device 17 will again alternate between the sleep state 320 and the standby active state 310 to monitor for wake signals W while conserving power. Various other transition events 350 could also occur such as a vacation mode activation, a photosensor's detecting night, a clock's indicating nighttime, or a combination of the above. For instance, an indication that the time is between midnight and four in the morning where activity is unlikely is a good candidate for operating in a reduced power mode.

As described above, the accessory device 17 can be one of many various barrier operator accessories. With reference to FIGS. 2 and 3 and the accompanying descriptions, the accessory device monitors 330 for the occurrence of an event E, and the controller 12 generates 235 control signals for operating the barrier 16 based on signals received at step 233. By one approach, the accessory device 17 could be a photo-eye 17a for determining whether an object is located in the path of the barrier 16 in the case where the barrier 16 is a garage door. In this approach, the photo eye 17a operates in the standby mode 305 until it receives 315 the signal W from the remote transmitter 20. The photo-eye 17a monitors 330 an area in the path of the barrier 16. In this approach, the event E occurs when an object enters or is located in the path of the barrier 16. At the occurrence of such an event E, the photo-eye 17a will transmit a command signal A (in this approach, a broadband spread spectrum signal) to the controller 12 to alert the controller 12 of the object's location. The controller 12 will generate 235 a control signal to either alter the operation of the barrier 16 or allow the barrier 16 to remain at its current state depending on the current status of the barrier 16. For example, if the barrier 16 is closing, the controller 12 will generate 235 a control signal to stop the barrier 16 from closing. If the barrier 16 is opening, the controller 12 will generate 235 a control signal to allow the barrier 16 to complete its operation. If the barrier 16 is not moving, the controller 12 will generate 235 a command to keep the barrier 16 stationary.

Similarly, in another approach, the accessory device 17 could be configured to monitor for an event E where the event E is a vehicle leaving the area of the system 10. For example, if a vehicle passes through a certain area of the property, the accessory device 17 could command the controller 12 to close the barrier 16.

Other accessory devices 17 known in the art may also be used. By these approaches, the accessory devices 17 will operate in the standby mode 305 until receiving 315 a wake signal W from the remote transmitter 20, at which time the accessory devices 17 will operate in the operation mode 325. In one approach, the controller 12 could transmit the wake signal W if controller 12 includes transmitting capability. Some accessory devices 17 may stay active for periods longer or shorter than the controller 12 depending on their use. For example, a parking assist accessory device 17 may operate for a brief period of time after the barrier 16 has opened at which point it will operate in the standby mode 305 until receiving another wake signal W. The various accessory devices 17 may be configured to accommodate the various needs of the end user. Various accessory devices 17 will monitor 330 for the occurrences of various events E. The accessory devices 17 may be configured to transmit 340 various command signals A depending on the type of event E. Depending on the type of event E and the command signal A, the controller 12, in response to receiving 233 the command signal A, will generate 235 the necessary control signal to operate the barrier 16 as determined by the controller 12.

As described above, the controller 12 and accessory device 17 are capable of operating in a plurality of modes and states resulting in various energy consumption and security. As previously described with reference to FIG. 2, while operating in the operation mode 225, the controller 12 generally scans for a broadband spread spectrum signal (either command signal C from the transmitter or command signal A from the accessory device 17). And with reference to FIG. 3, while in the operation mode 325, the accessory device 17 generally sends a broadband spread spectrum signal for command signal A to maximize security and reliability of the communication between these components. However, the controller 12 and/or the accessory device 17 can be configured to operate differently to suit particular energy consumption and security needs if desired. The operation of the controller 12 and accessory device 17, with reference to FIGS. 2 and 3, respectively, applies similarly in the event that different frequency types are scanned for or transmitted. In some instances, reduced band spread spectrum signals can be used. In other instances, a single frequency signal can be used.

With reference to Table 1, the controller 12 and accessory device 17 can scan for different types of signals corresponding to different frequency types for wake signal W, command signal C, and command signal A. Likewise, the transmitter 20 and accessory device 17 transmit signals containing at least the corresponding frequency type. In some approaches, the same type of frequency can be used for different signals. While the frequency types may be the same, they are not necessarily the identical range. For example, a reduced band spread spectrum signal could be used for both the command signal C and the command signal A in some embodiments, but the particular range of frequencies are not identical and, therefore, the command signal C may be distinct from command signal A.

TABLE 1

| Combination | Wake Signal W | Command Signal C | Command Signal A |
|---|---|---|---|
| 1 | Reduced Band Spread Spectrum | Broadband Spread Spectrum | Broadband Spread Spectrum |
| 2 | Reduced Band Spread Spectrum | Broadband Spread Spectrum | Reduced Band Spread Spectrum |
| 3 | Single Frequency | Broadband Spread Spectrum | Broadband Spread Spectrum |
| 4 | Single Frequency | Reduced Band Spread Spectrum | Reduced Band Spread Spectrum |
| 5 | Single Frequency | Broadband Spread Spectrum | Reduced Band Spread Spectrum |
| 6 | Single Frequency | Reduced Band Spread Spectrum | Broadband Spread Spectrum |
| 7 | Reduced Band Spread Spectrum | Reduced Band Spread Spectrum | Reduced Band Spread Spectrum |
| 8 | Reduced Band Spread Spectrum | Reduced Band Spread Spectrum | Broadband Spread Spectrum |

The above description for the controller 12 and accessory device 17 applies most directly to the first combination of Table 1, where the wake signal W is a reduced band spread spectrum signal, the command signal C is a broadband spread spectrum signal, and the command signal A is broadband spread spectrum signal. The transmitter 20 sends the wake signal W for reception at the controller 12 and the accessory device 17. The transmitter 20 sends the command signal C for reception at the controller 12. The accessory device 17 sends the command signal A for reception at the controller 12. Further approaches are listed in the table and further described below. As mentioned previously, signals sent may include additional frequencies in addition to the signal scanned for. Thus, when referring to the above table, the indicated signal type is the scanned for signal type, but signals sent may be broader, thereby allowing components that transmit to be configured to send one signal that can be received even if the receiving component is scanning for a narrower range depending on the operating mode or state.

In combination 2, the wake signal W is a reduced band spread spectrum signal. The command signal C is a broadband spread spectrum signal. The command signal A is a reduced band spread spectrum signal. Thus, in this embodiment, the receiver 22 scans for both the broadband spread spectrum command signal C and the reduced band spread spectrum command signal A.

In combination 3, the wake signal W is a single frequency signal, the command signal C is a broadband spread spectrum signal, and the command signal A is broadband spread spectrum signal. This requires less energy consumption during the standby modes 205 and 305 than if the wake signal W was a reduced band spread spectrum signal. While the security and reliability of this single frequency scanning approach may be less than when scanning for reduced spread spectrum signals, this potential concern is alleviated because a matching unauthorized signal will only activate the operation modes of the components but would be insufficient to effect control of the system 10 because command signals C and A are broadband spread spectrum signals that are more difficult to duplicate.

Combination 4 is similar to combination 3, except that command signals C and A are reduced band spread spectrum signals. This results is less energy consumption than if signals C and A are broadband spread spectrum signals. A reduced band spread spectrum signal may be easier to duplicate than a broadband spread spectrum signal, but still more difficult to duplicate than a single frequency signal. Thus, an unauthorized user will still need to duplicate the reduced band spread spectrum signal to effect control of the system 10 in the event that the single frequency wake command W is duplicated.

In combination 5, the wake signal W is a single frequency signal, the command signal C is a broadband spread spectrum signal, and the command signal A is a reduced band spread spectrum signal.

In combination 6, the wake signal W is a single frequency signal, the command signal C is a reduced band spread spectrum signal, and the command signal A is a broadband spread spectrum signal.

In combination 7, the wake signal W is a reduced band spread spectrum signal, the command signal C is a reduced band spread spectrum signal, and the command signal A is a reduced band spread spectrum signal. While each signal is a reduced band spread spectrum signal, the signals can be differentiated by using different spread spectrum ranges.

In combination 8, the wake signal W is a reduced band spread spectrum signal, the command signal C is a reduced band spread spectrum signal, and the command signal A is a broadband spread spectrum signal.

Thus, various combinations of signal scanning during both the active state and the standby state are possible to suit the particular needs of the user. The user can determine and alter the appropriate level of security and energy consumption if desired. For example, a user can enter a vacation mode or set time or light settings that may indicate reduced activity such that maximum energy savings can be achieved. As previously described, spread spectrum signals can be of many various frequency ranges, and the terms "broadband" and "reduced band" are merely illustrative and relative to each other. Indeed, different barrier operator systems preferably use different sets of frequencies to prevent unauthorized entry by an owner of a similar system.

In the above mentioned combinations, the wake signal W has generally been the same signal for waking both the controller 12 and the accessory device 17. However, in another approach a wake signal W1 for the controller 12 is a different signal than a wake signal W2 for the accessory device 17. The operation of both the controller 12 and the accessory device 17 is generally the same as described with reference to FIGS. 2 and 3, except that wake signals W1 and W2 replace the generic wake signal W at steps 210 and 310, respectively.

In one such approach, the receiver 22 scans 210 a first reduced band spread spectrum frequency for wake signal W1 while operating in the standby mode 205. The accessory device 17 scans 310 a second reduced band spread spectrum frequency for wake signal W2 while operating in the standby mode 305. The remote transmitter 20 transmits a first broadband spread spectrum signal that includes both the wake signal W1 and the wake signal W2 (the first and the second reduced band frequencies, respectively). The receiver 22 receives 215 wake signal W1 from the remote transmitter 20 because the transmission includes wake signal W1. Additionally, the accessory device 17 receives 315 the wake signal W2 because the transmission includes wake signal W2. In response to receiving 215 wake signal W1, the receiver 22 enters the operation mode 225 and scans 230 for command signal C and command signal A as previously described with reference to FIG. 2. In this approach, the command signal C corresponds to the first broadband spread spectrum signal that was sent by the remote transmitter 20. Thus, the single transmission from the remote transmitters 20 is capable of waking both the controller 12 and the accessory device 50, and is also capable of initiating operation or the barrier 16.

The accessory device 17, in the operation mode 325, operates as previously described with respect to FIG. 3. In this approach, the command signal A is a broadband spread spectrum signal. However, the command signal A be a reduced band spread spectrum signal or another frequency type known in the art.

The above description is merely illustrative. The concept behind the single transmission is not limited to the above described approach having distinct wake signals W1 and W2. Indeed, if a single wake signal W is used for both the controller 12 and the accessory device 17, as previously described with reference to FIGS. 2 and 3, the wake command W and command signal C can be included in a single transmission from the remote transmitter 20. Likewise, the particular frequency types for wake commands W1 and W2 and command signals C and A are not limited to those described. As previously mentioned, a variety of frequency types can be used for the various command signals. For example, wake command W2 can be a single frequency signal. Command signal C could be a reduced band spread spectrum frequency. Those skilled in the art will appreciate the variety of possible combinations of signal types for the various command signals and wake signals.

With reference to the above descriptions, the various wake signals W are transmitted by the remote transmitter 20. However, in other approaches, the controller 12 may transmit a wake signal W3, which may operate to wake the accessory device 17. The accessory device 17 may be configured to receive at least one of the wake signals W, W1, W2, W3. Those skilled in the art will appreciate that many of above described combinations and their various modifications can be further modified to include the use of the wake signal W3 sent from the controller 12.

As described above, the various standby and active states, along with the various frequency ranges that the components scan affects the overall power consumption of the system 10.

In most cases, the system 10 is connected to the power source 18, which provides power to at least a portion of the system 10. When the receiver 22 is in the operation mode 225 and, for example, scanning 230 a broadband spread spectrum frequency it consumes a relatively higher amount of energy while doing so. When the receiver 22 is in the standby mode 205 and, for example, scanning 210 a reduced band spread spectrum frequency, it consumes relatively less energy. In one approach, the receiver 22 can scan 210 a narrower range of frequencies while operating in the standby mode 205, for example a single frequency, and consume even less power. Thus, depending on power consumption needs or requirements, the system 10 can be selectively adjusted to scan 210 different frequency types when operating in the standby mode 205. In addition to the narrower range of scanned frequencies, the standby mode 205 further conserves power by alternating between the sleep state 220 and the standby active state 210.

Figure 4:
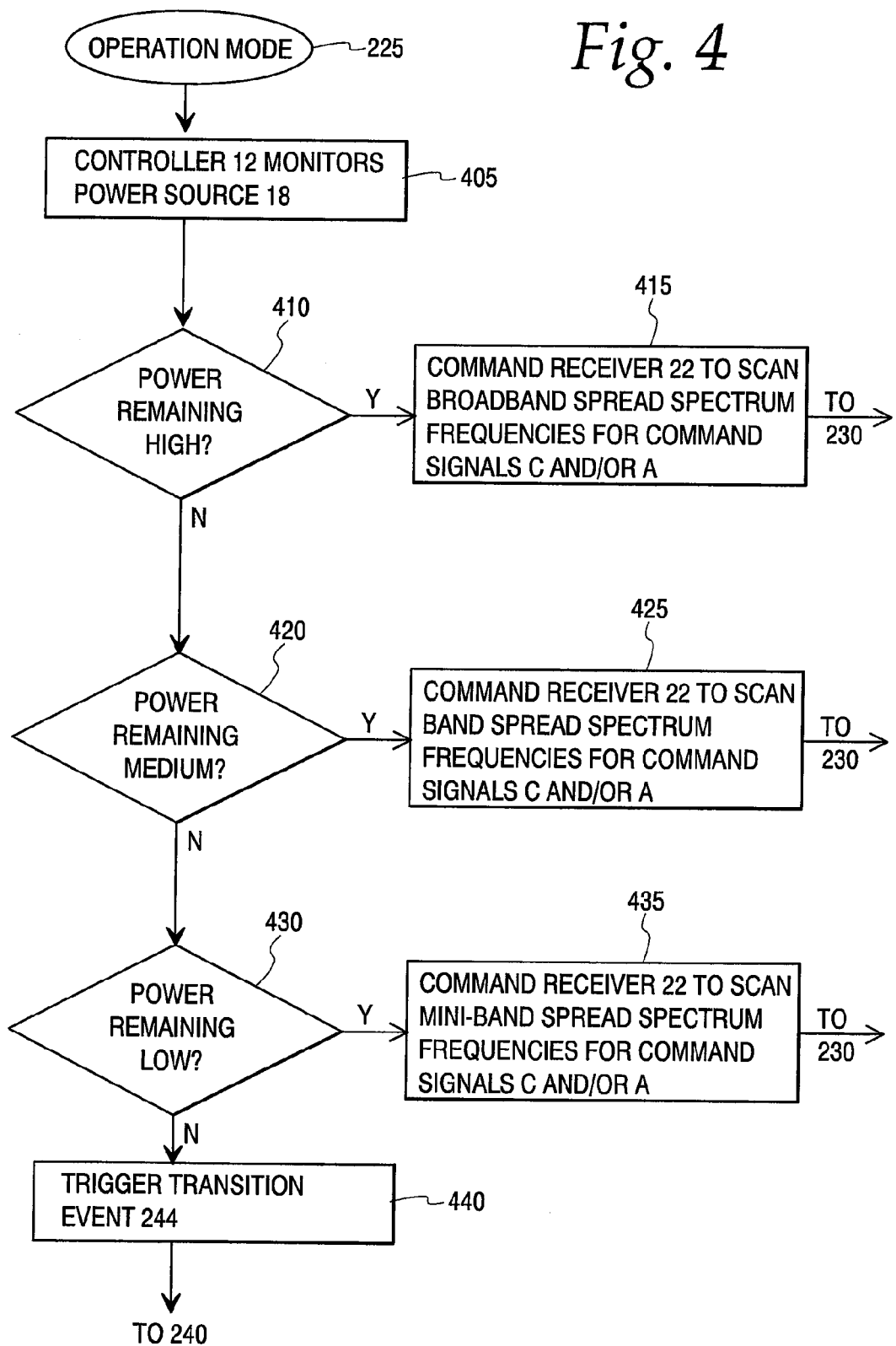
FIG. 4 comprises a second flow chart of the controller as configured in accordance with various embodiments of the invention.

As shown in FIG. 4 (and with reference to FIG. 2), in one approach while in the operation mode 225, the controller 12 monitors 405 the power source 18 to determine available power remaining. Based on the amount of power remaining, the controller 12 may be configured to command the receiver 22 to scan different ranges or types of frequencies. In determining the amount of power available, a plurality of power thresholds can be set such that the controller 12 can reference these thresholds to determine whether a high, medium, or low amount of power is remaining. For purposes of discussion, generic terminology such as high, medium, and low will be used; however, those skilled in the art will appreciate that there exist additional thresholds corresponding to various predetermined power levels.

If the controller determines 410 that the high power remaining threshold is met, the controller 12 will operate in a high power mode and command 415 the receiver 22 to scan broadband spread spectrum frequencies for command signals C and A at step 230. If the controller 12 determines at step 410 that there is less than the high power threshold remaining, the controller 12 will determine 420 whether there is a medium amount of power remaining If the controller 12 determines 420 that the medium power threshold is met, the controller 12 will operate in a medium power mode and command 425 the receiver 22 to scan 230 reduced band spread spectrum frequencies for command signals C and A, where the reduced band spread spectrum frequencies are narrower than the broadband range. If the controller 12 determines 420 that the medium power threshold is not met, the controller 12 will determine 430 if the low power threshold is met. If the controller 12 determines 430 that the low power threshold is met, the controller 12 will operate in a low power mode and command 435 the receiver 22 to scan 230 a mini-band spread spectrum frequency for command signals C and A, where the mini-band of frequencies is less than the reduced band of frequencies. Alternatively, rather than scanning a mini-band spread spectrum frequency, the controller 12 could command 435 the receiver 22 to scan a single RF frequency. If the controller 12 determines 430 that the low power threshold is not met, the controller 12 will trigger transition event 244, thereby returning the controller 12 to the standby mode 205. The threshold power levels for automatic adjustment of the scanned frequencies can be configured and altered by the user if desired.

Additionally, in the standby mode 205, the controller 12 can similarly adjust the range of frequencies to scan 210 in response to determining that whether a particular power threshold exists. The operation is similar to that of the operation mode 225 illustrated in FIG. 4, whereby as power levels decrease, the controller 12 will command the receiver 22 to scan 210 narrower frequency ranges for wake signal W.

Figure 5:
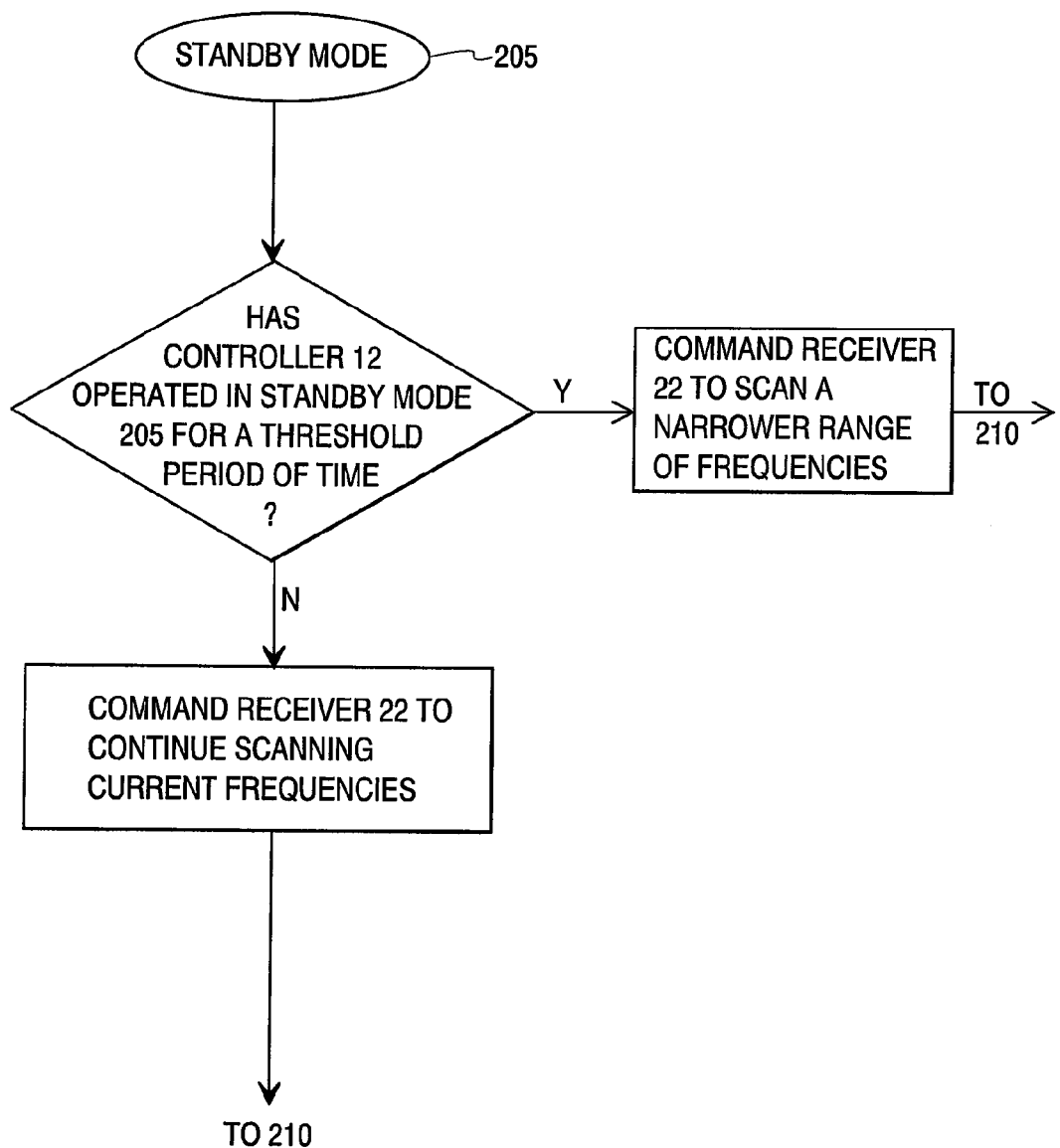
FIG. 5 comprises a third flow chart of the controller as configured in accordance with various embodiments of the invention.

As shown in FIG. 5, in the standby mode 205, the barrier operator system 10 can also automatically adjust the scanned frequencies at step 210 based on whether a predetermined period of time has elapsed. By one approach, in the standby mode 205, the controller 12 will determine 505 whether the controller 12 has operated in the standby mode 205 for a predetermined period of time. If the controller 12 has been operating in the standby mode 205 for the predetermined period of time, the controller 12 will command the receiver 22 to scan 210 a narrower range of frequencies for wake signal W. Because the controller 12 operated in the standby mode 205 for this predetermined period of time, this generally indicates that there has been a lack of successful attempts to transmit wake signal W to the receiver 22, and the higher level of security afforded by the broader range of scanned frequencies may be unnecessary. For example, if the controller 12 has been operating in the standby mode 205 for a week without receiving 215 the wake signal W, this could indicate that use of the system 10 is not necessary and, furthermore, that unauthorized users have not attempted to wake the system 10 during that time. Vacation mode settings, time settings, or light sensor can provide additional inputs for determining in which mode the system 10 may operate. Thus, the system 10 will use relatively less power while in the standby mode 205 after decreasing the range of scanned frequencies.

Figure 6:
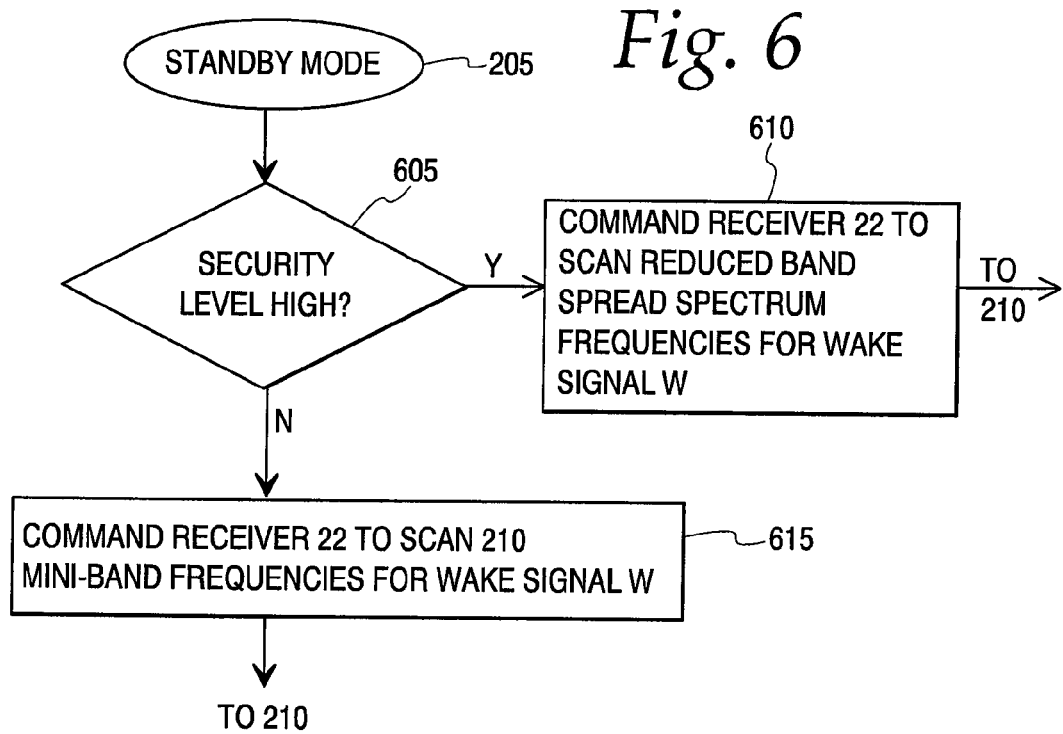
FIG. 6 comprises a fourth flow chart of the controller as configured in accordance with various embodiments of the invention.

By one approach, the level of security/power can be manually adjustable by the end user or technician to determine the frequencies to scan. As shown in FIG. 6, during the standby mode 205, the controller 12 will determine whether a high security/power setting is selected. The general operation of the controller 12 will operate as previously described with reference to FIG. 2. While in the standby mode 205, the controller 12 will determine 605 whether the security/power setting is high. If the security/power is high, then the controller 12 will command 610 the receiver 22 to scan 210, for example, reduced band spread spectrum frequencies for the wake signal W. If the security/power setting is not high, the controller 12 will command 615 the receiver 22 to scan 210, for example, a single frequency for the wake signal W.

Figure 7:
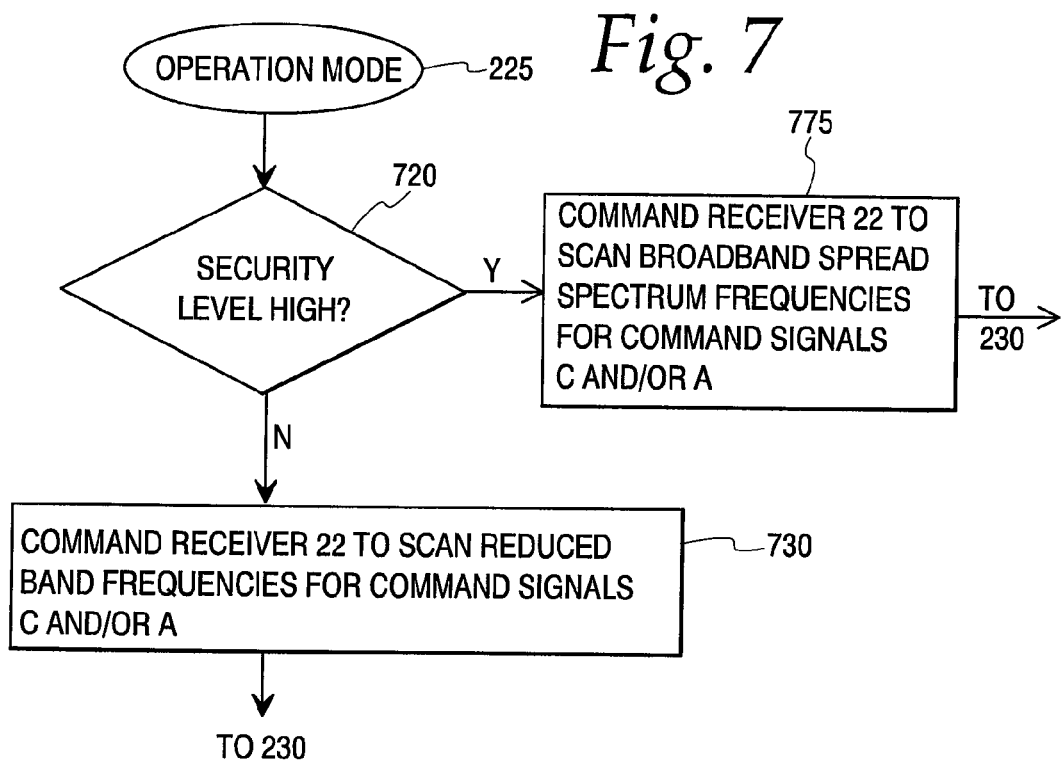
FIG. 7 comprises a fifth flow chart of the controller as configured in accordance with various embodiments of the invention.

The controller 12 makes a similar determination while in the operation mode 225. With reference to FIG. 7, while in the operation mode 225, the controller 12 will determine 720 whether the security/power setting is high. If the security/power is high, then the controller 12 will command 725 the receiver 22 to scan 230, for example, broadband spread spectrum frequencies for the command signals C and A. If the security/power setting is not high, the controller 12 will command 730 the receiver 22 to scan 230, for example, a reduced band frequency for the command signals C and A.

While the security/power setting has been described with respect to a high security/power setting being active or not, additional levels of security/power are also possible. For example, if three or more security/power settings are available, if the controller determines at step 605 or 720 that the high security/power setting is not selected, the controller could determine whether a second, third, etc. security/power setting is selected. In response to determining the selected security/power setting, the controller 12 will command the receiver 22 to scan at steps 210 or 230 according to the assigned ranges. As previously described, broader ranges of spread spectrum frequencies result in relatively higher security but consume relatively larger amounts of energy. Additionally, the range of frequencies scanned by the receiver at step 210 is generally narrower than the range of frequencies scanned by the receiver 22 at step 230. With these concepts in mind, skilled artisans can appreciate the wide variety of possible security/power settings and corresponding ranges of frequencies scanned.

As described with reference to FIG. 4, the system 10 can monitor the power level of the power source 18 and automatically adjust the scanned frequencies. The automatic adjustment illustrated in FIG. 4 and the manual selection of security/power settings illustrated in FIG. 6 can both operate together within the system 10. In one approach, the user can select whether the automatic power adjustment will override the security/power settings. For example, if the power monitor override is selected, the controller 12 can monitor 405 the power remaining in combination with determining at step 605 or 620 the level of security/power selected. In the event that the power remaining decreases below one of the power thresholds, the controller 12 will command the receiver 22 to narrow the range of scanned frequencies from the range determined by the security/power setting.

In another approach, the user can select that the security/power setting will override an automatic adjustment based on the power remaining In this approach, regardless of the amount of power remaining, the controller 12 will generally not command the receiver 22 to alter the range of scanned frequencies aside from changing between the standby mode 205 and the operation mode 225 as described with reference to FIG. 2.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. An accessory device comprising:
a connection to a power source;
a transmitter configured to transmit command signals to a barrier operator;
a radio receiver responsive to a command output from a remote transmitter;
wherein the radio receiver comprises a spread spectrum receiver configured to scan a first range of frequencies when the radio receiver operates in a first mode and a reduced range of frequencies when the radio receiver operates in a second mode;
wherein in response to receiving the command output from the remote transmitter while operating in the second mode, the radio receiver is configured to switch from operating in the second mode to operating in the first mode;
wherein in response switching to the first mode, the transmitter is configured to transmit one of a broadband range or a reduced range of spread spectrum frequencies to the barrier operator; and
wherein the transmitter is configured to sleep when the transmitter operates in the second mode.

2. The device of claim 1, wherein the radio receiver is configured to scan a single radio frequency of the reduced range of frequencies when the radio receiver operates in the second mode.

3. The device of claim 1, wherein the device is selected from a group consisting of a photo-eye, a remote light control, a barrier monitor, and a parking accessory.

4. A method for operating a barrier operator accessory device, the method comprising:
scanning, by an accessory device comprising a radio receiver, a radio frequency while operating in a second mode;
while operating in the second mode, receiving, at the radio receiver, a transmission signal from a first device, the first transmission signal comprising the radio frequency;
in response to receiving the first transmission signal, operating in a first mode and transmitting, by a transmitter at the accessory device, a second transmission signal to a second device, the second transmission signal comprising a spread spectrum radio frequency, wherein the second device is a barrier operator;
wherein the scanning the radio frequency comprises scanning a reduced band of spread spectrum frequencies while operating in the second mode.

5. A method for operating a barrier operator accessory device, the method comprising:
scanning, by an accessory device comprising a radio receiver, a radio frequency while operating in a second mode;
while operating in the second mode, receiving, at the radio receiver, a transmission signal from a first device, the first transmission signal comprising the radio frequency;
in response to receiving the first transmission signal, operating in a first mode and transmitting, by a transmitter at the accessory device, a second transmission signal to a second device, the second transmission signal comprising a spread spectrum radio frequency, wherein the second device is a barrier operator;
wherein the second transmission signal comprises a reduced band of spread spectrum frequencies.

6. A method for operating a barrier operator accessory device, the method comprising:
scanning, by an accessory device comprising a radio receiver, a radio frequency while operating in a second mode;
while operating in the second mode, receiving, at the radio receiver, a transmission signal from a first device, the first transmission signal comprising the radio frequency;
in response to receiving the first transmission signal, operating in a first mode and transmitting, by a transmitter at the accessory device, a second transmission signal to a second device, the second transmission signal comprising a spread spectrum radio frequency, wherein the second device is a barrier operator;
wherein the second transmission signal comprises a broadband range of spread spectrum frequencies.

7. A method for operating a barrier comprising:
- scanning, at a controller comprising a controller radio receiver, a first reduced range of radio frequencies while operating in a second mode;
- scanning, at an accessory device comprising an accessory radio receiver and an accessory transmitter, a second reduced range of radio frequencies while operating in the second mode;
- while operating in the second mode, receiving, at the controller radio receiver, from a transmitter device, the first reduced range of radio frequencies from a remote transmission signal comprising a full range of radio frequencies further comprising both the first and the second reduced range of radio frequencies;
- while operating in the second mode, receiving, at the accessory radio receiver, from the transmitter device, the second reduced range of radio frequencies from the remote transmission;
- in response to receiving the second reduced range of frequencies at the accessory radio receiver, operating the accessory device in the first mode;
- while operating in the first mode, transmitting, from the accessory transmitter, to the controller radio receiver, an accessory transmission;
- in response to receiving the first reduced range of radio frequencies at the controller radio receiver, scanning a first full range of radio frequencies while operating in a first mode; and
- while operating in the first mode, receiving, at the controller radio receiver, the accessory transmission.

8. The method of claim 7 further comprising:
- in response to receiving the accessory transmission at the controller, sending a control signal to a movable barrier operator to move a barrier.

9. The method of claim 7 wherein the second reduced range of frequencies comprises a single radio frequency.

10. The method of claim 7 wherein the first reduced range of frequencies is the same as the second reduced range of frequencies.

11. A barrier operator comprising:
- a connection to a power source;
- a controller, responsive to command inputs to generate control signals to control barrier movement;
- a motor responsive to the control signals for moving the barrier;
- a radio receiver responsive to command outputs from a transmitter;
- wherein the radio receiver is configured to scan a full range of frequencies when the controller operates in a first state comprising a first rate of power consumption;
- wherein the radio receiver is configured to selectively scan a first range of frequencies of the full range of frequencies when the controller operates in a second state comprising a second rate of power consumption, the second rate of power consumption being less than the first rate of power consumption;
- wherein the radio receiver is configured to selectively scan a second range of frequencies of the full range of frequencies when the controller operates in a third state comprising a third rate of power consumption, the third rate of power consumption being less than the second rate of power consumption;
- wherein the controller is configured to choose and operate in a particular state in response to monitoring information regarding at least one of power remaining in the power source and a desired security level;
- wherein, in response to receiving a command output from the transmitter, the controller is configured to switch to a subsequent operating state by one of switching from the second state to the first state or switching from the third state to the second state; and
- wherein the controller is configured to receive an accessory transmission from an accessory device while operating in the subsequent operating state.

12. The barrier operator of claim 11, wherein the radio receiver is configured to operate in a sleep state and scan no frequencies when the controller operates in a fourth state.

13. The barrier operator of claim 12, wherein the controller is configured to automatically alternate between the fourth state and at least one of the second state or the third state based on an amount of power remaining in the power source.

14. The barrier operator of claim 11, wherein the controller is configured to alternate between the fourth state and at least one of the second state or the third state.

15. The barrier operator of claim 11, wherein the controller is configured to automatically select and operate in at least one of the second state or the third state based on an amount of power remaining in the power source.

16. A method for operating a barrier, the method comprising:
- monitoring a power level in a power source connected to a barrier operator;
- receiving an indication of a security level at which to operate;
- operating the barrier operator at one of a first mode or a second mode of operation according to a function of the power level and the security level;
- wherein operating in the first mode comprises scanning at a radio receiver of the barrier operator a first range of frequencies;
- wherein operating in the second mode comprises scanning at the radio receiver a second range of frequencies, wherein the second range of frequencies is less than the first range of frequencies;
- while operating in one of the first mode or the second mode, receiving at the radio receiver, from a first device, a first transmission signal comprising at least the first range of frequencies or the second range frequencies;
- in response to receiving the first transmission signal, operating the barrier operator in a third mode comprising scanning at the radio receiver the full range of frequencies; and
- while operating in the third mode, receiving at the radio receiver, from a second device, a second transmission signal.

17. The method of claim 16, further comprising:
- operating the barrier operator in a sleep state wherein the radio receiver does not scan frequencies.

18. The method of claim 16, further comprising:
- alternating operation of the barrier operator between the sleep state and one of the first mode or the second mode.

19. The method of claim 18, further comprising:
- operating in the sleep state for a range of about 200 to 600 milliseconds and then operating in the one of the first mode or the second mode for a range of about 25 to 75 milliseconds before returning to the sleep state in response to not receiving a wake signal during the one of the first mode or the second mode.

20. The method of claim 16, further comprising:
- receiving an indication from the power source that the power source comprises a threshold amount of power remaining; and
- changing the barrier operator mode of operation in response to receiving the indication.

* * * * *